Nov. 18, 1941.  A. LAZAR ET AL  2,263,041
PREPARATION OF SULPHONIC ACIDS
Original Filed March 30, 1938
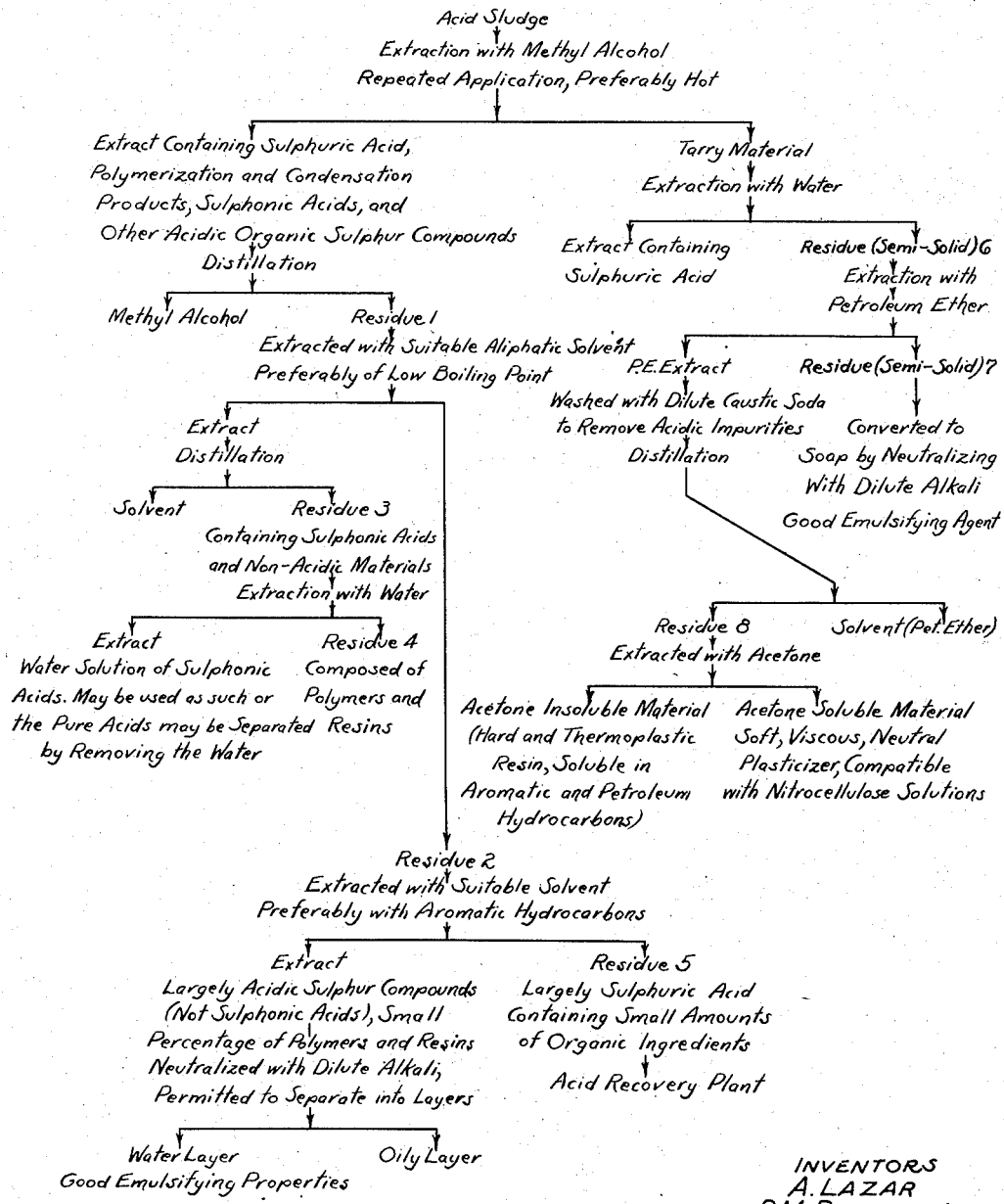

Patented Nov. 18, 1941

2,263,041

UNITED STATES PATENT OFFICE 2,263,041

PREPARATION OF SULPHONIC ACIDS

Arthur Lazar and Paul Moritz Ruedrich, Berkeley, Calif., assignors to Tide Water Associated Oil Company, San Francisco, Calif., a corporation of Delaware Original application March 30, 1938, Serial No. 198,976. Divided and this application April 18, 1939, Serial No. 268,490

16 Claims. (Cl. 260—504)

This invention relates to the preparation and purification of sulphonic acids.

An object is to provide a process whereby acid sludges may be treated to recover sulphonic acids and other valuable by-products therefrom.

Other objects of invention will be apparent as the subject is more fully disclosed.

The usual processes of preparation and purification of sulphonic acids involve the sulphonation of reactive hydrocarbons in oils with fuming sulphuric acid, the neutralization of sulphonic acids formed with an alkaline reagent and the separation and purification of such acids over their metal salts.

By this is meant that the sulphonic acids are extracted as water soluble alkali salts, the latter being converted to less soluble alkaline earth metal salts, which then can be purified by either recrystallization or any other conventional means. From the purified salts, the pure sulphonic acids then can be isolated by acidification with mineral acids.

This invention provides a process of preparation, extraction, and purification which may be applied to the production of all types of sulphonic acids. One of the advantages of such process is that it permits the preparation of substantially pure sulphonic acids utilizing only standard metal equipment.

The type of hydrocarbon oil, which may be used as the starting point of the sulphonation process, is governed commercially solely by the necessary qualification that appropriate yields of sulphonic acids can be obtained therefrom by sulphonation, but the process is broadly applicable to the production of sulphonic acids from all sulphonatable hydrocarbon oils, such as may initially be obtained, for instance, from a lubricating oil fraction from petroleum. Such a fraction may be from naphthenic, paraffinic or mixed base crudes, and the preferred viscosity range is from 45 to 350 viscosity Saybolt Universal at 100° F.

Such base oil fraction may be sulphonated directly or may be first subjected to treatment by a solvent refining process, such as is well known in the use of liquid sulphur dioxide, furfural, benzol-sulphur dioxide, phenol, cresylic acid, dichlorethylether, or by other well known solvent refining processes, whereby an extract is removed therefrom. The material which is insoluble in the selective solvent will hereafter be termed raffinate, and is an oil which is preferably the raw material used for sulphonation.

For the sulphonation of the base oil concentrated sulphuric acid is recommended, however, other sulphonating agents may be used. For example, chlorosulphonic acid, or sulphuric acid in conjunction with certain water absorbing ingredients, such as phosphorous pentoxide, may be used to aid the sulphonation process. By concentrated sulphuric acid, 66° Bé. up to 50% fuming sulphuric acid is meant; however an acid strength of 5 to 20% fuming sulphuric acid is preferred.

In the sulphonation of the raffinate the acid is preferably added in increments of from 5 to 10 pounds per barrel of oil. The first few increments attack oil constituents which are easily sulphonated, oxidized or polymerized and remove them as a tarry mass in the acid sludge. Through the initial removal of such constituents, acid used in subsequent increments is not spent in side reactions, but is directed in substantially full strength towards the sulphonation of hydrocarbons to yield sulphonic acids. By the use of acid in increments therefore acid sludges can be produced in which the concentration of acid tar progressively decreases while the concentration of sulphonic acids which remain dissolved in the oil increases.

To illustrate the increase in concentration of sulphonic acids which remain dissolved in the oil, with progressive applications of increments of acid, the following data are given:

| Increment number | Quantity of acid used | Percent sulphonic acids by weight dissolved in the oil |
|---|---|---|
| 1 | 10 lbs. per barrel of 15% fuming H$_2$SO$_4$ | 2.63 |
| 2 | ....do.... | 4.30 |
| 3 | ....do.... | 5.59 |

The percent of sulphonic acids which remains in the oil increases with the increments of acid.

It is found, however, that as the concentration of sulphonic acids in the oil is increased, the sulphonating action of the sulphuric acid gradually decreases. In other words, the sulphonation process slackens and the efficiency of the treating reagent decreases, in proportion to the accumulation of sulphonated components in the oil. For this reason it is often preferred to remove the sulphonic acids, after their concentration has reached about 5% by weight, as an intermediate processing step. Such removal can be accomplished by neutralization with an alkali, thus converting the sulphonic acids into soaps. It is preferred, however, to accomplish such removal by the process shown in our copending application now U. S. Patent Number 2,218,174.

By using this step procedure of alternate sulphonation and removal of sulphonated products, the advantages are:

1. Better utilization of the treating agent.
2. Increased yields of sulphonic acids.
3. A segregation of sulphonic acids according to types, as explained in detail below.

This procedure is highly recommended in the manufacture of technical white oils and medicinal type oils, or any other type of highly refined mineral oil. As as example, it is possible to obtain a water white odorless and non-fluorescent oil by treatment with considerably less acid by this step procedure, than by the procedure in which the intermediate removal of sulphonated products is omitted.

Our process, however, is so flexible that it may be applied to acid oils containing sulphonic acids or acid sludges irrespective of the means or manner of adding the sulphonating agent. The use of increments of acid is preferred largely for ease of operation in that it effects a partial preliminary isolation of chemical constituents.

The total quantity of acid which may be used may vary up to 100 percent by volume but in most instances 1.5 to 20% by volume is used. After several increments of acid are applied the acid produces sulphonic acids which are predominately of the oil soluble type.

The temperatures employed in the above described application of sulphuric acid are regulated to produce the desired sulphonation. When relatively low rates of acid are employed the maximum sulphonating temperature is held to below about 130° F. After an initial application of acid and withdrawal of sludge the sulphonation of the residual oil may be performed at temperatures up to 350° F., but temperatures should be avoided at which the sulphuric acid usually acts as an oxidizing agent.

In the practice of the invention, the preparation of sulphonic acids and other by-products may often be profitably combined with the refining of a lubricating oil fraction. In so doing just sufficient acid is employed to suitably refine the oil and produce an equivalent quantity of sulphonic acids. When such treatment is performed there is produced (1) an acid oil containing free sulphonic acids (2) acid sludges isolated in increments. The acid sludges are processed separately and such steps are further set forth in detail, which are illustrated as diagrammatic flow sheet in the accompanying drawing, merely as an aid in following the text of the specification.

Treatment of acid sludges

The acid sludges which have been derived in the sulphonation of the base oil, as previously disclosed, are processed for the recovery of sulphonic acids and other valuable by-products. The complete processing procedure is shown in the figure and the various steps of treatment may be followed by reference thereto.

The first step in the treatment of acid sludges is an extraction with an organic solvent. Organic solvents, like mono and polyhydric alcoholes, ketones, oxides, halogenated alcohols, acetates, esters, or aldehydes can be used in our process either undiluted or in aqueous solutions. A few of those which are suitable are:

| | |
|---|---|
| Alcohols | Methyl alcohol<br>Ethyl alcohol<br>Propyl alcohols<br>Ethylene glycol<br>Glycerol<br>Hexahydric alcohols |
| Ketones | Acetone<br>Diacetone |
| Oxides | Dioxan |
| Esters | Ethylene glycol acetate<br>Diethylene glycol acetate |
| Ethers | Methyl ether of ethylene glycol<br>Ethylether of ethylene glycol |
| Ether-esters | Ethyl ether of diethylene glycol acetate |
| Aldehydes | Formaldehyde<br>Acetaldehyde |
| Chlorhydrins | Ethylene chlorhydrin<br>Diethylene chlorhydrin |

It is advantageous not to use aqueous solutions of solvents for sludge treatment. Further, of the solvents, methyl alcohol is preferred because it not only serves the function of extracting substantially all the sulphonic acids and leaving undissolved tarry matter behind, but it is also particularly amendable to recovery due to its low boiling point.

The methyl alcohol is added to the acid sludge and thoroughly mixed therewith, through efficient agitation as for example by a mechanical mixing device. This operation may be performed at any temperature at which the solvent remains liquid, temperatures above atmospheric improving contact between acid sludge and the extracting medium. After a suitable period of agitation the mixture is permitted to stand and separate into layers. The upper, or methyl alcohol layer, is then decanted from the tarry material. Several applications of solvent are applied in order to remove substantially all the methyl alcohol soluble ingredients from the tarry material. At this point in the processing there is produced (1) a methyl alcohol extract, (2) a tarry residue.

The methyl alcohol extract contains sulphuric acid, polymerization and condensation products, sulphonic acids, and other acidic organic sulphur compounds. This extract is distilled, as for example, under vacuum, and the methyl alcohol removed for reuse. The material in the still, which is termed residue #1 in the figure, is then extracted with an organic solvent which will dissolve the sulphonic acids and leave the sulphuric acid undissolved. Aliphatic hydrocarbon solvents are applicable, and such as have low boiling points are preferred. Examples of solvents are propane, butane, and petroleum ether. The use of solvents like liquefied propane or butane is advantageous because, after extraction is accomplished and the solvent decanted, the latter may be separated by distillation at a low temperature.

For the purpose of illustration there is shown, in the figure, an extraction of residue #1 with petroleum ether. After the stratification of layers the solvent extract is decanted off leaving residue #2. To facilitate the description, the processing of (1) residue #2, (2) the solvent extract will be discussed separately.

Residue #2 contains the bulk of the sulphuric acid and organic materials such as acidic sulphur compounds. This residue is extracted with an aromatic solvent whereby substantially all the organic matter is dissolved and removed in the solvent leaving the sulphuric acid (residue #5) which, due to the removal of organic matter, is in condition to be recovered by well known acid recovery methods. The aromatic solvent extract is neutralized with an aqueous alkaline reagent and permitted to separate into layers. The lower or aqueous layer contains soaps of acidic organic sulphur compounds which have excellent emulsifying properties.

The petroleum ether extract derived in the treatment of residue #1 is distilled and the solvent recovered for reuse, leaving in the still residue #3. The latter is largely sulphonic acids and non-acidic organic matter. This residue is extracted with water whereby the final separation of the sulphonic acids is accomplished. The water extract contains the pure sulphonic acids and the oily residue (residue #4) is largely polymers and resins. Pure sulphonic acids are produced when the water is removed, e. g., by distillation, with or without vacuum.

By referring to the figure the processing steps can be easily followed. The treatment of the acid sludges as above described has resulted so far in the isolation of a number of valuable by-products as:

Pure sulphonic acids.
Polymers and resins.
Acidic sulphur compounds which have excellent emulsifying properties.
Sulphuric acid of substantial purity which is amenable to acid recovery due to the separation of organic matter therefrom.

Up to this point the methyl alcohol soluble portion of the acid sludge has been dealt with. The tarry material which had been left after the removal of the methyl alcohol extract is now processed for the further recovery of valuable by-products. The material is subjected to a hydrolizing treatment with steam or hot water. By repeated applications of hot water the sulphuric acid, formed by hydrolysis of the sulphuric acid esters, is removed, leaving a semi-solid residue (residue #6).

Residue #5 is extracted with a solvent, such as petroleum ether and all material soluble in such solvent removed. The semi-solid material (residue #7) which is insoluble in petroleum ether is neutralized with dilute alkali and found to be an excellent emulsifying agent.

The petroleum ether extract is washed with a dilute alkali to remove traces of acidic impurities and, after separation of the aqueous alkali, the extract is distilled. The petroleum ether, thus removed, is reused. The still residue (residue #8) is extracted with acetone whereby all acetone soluble constituents are removed in an extract. After separation of the solvent, by distillation, the acetone soluble material is found to be a soft, viscous, neutral material which, due to its compatability characteristics, is valuable as a plasticizer or, is useful in special applications, as for example, as a pigment vehicle in printer's ink.

The acetone insoluble material has the property of being soluble in petroleum and aromatic hydrocarbons. It is a hard, plastic solid which is of value as a coating material or may be used in lacquers by incorporation with resins, drying oils, or semi-drying oils, to impart film forming characteristics to the combination.

As in the processing of the methyl alcohol soluble constituents of the acid sludge, the treatment of the tarry residue from such extraction also yields valuable by-products. For example, the following products are obtained:

A good emulsifying agent.
A hard and thermoplastic resin which is soluble in petroleum hydrocarbons.
A soft, viscous, neutral material, valuable for use as a plasticizer and which is compatible with nitrocellulose solutions.

The process shown in the figure is quite complete and by means of repeated extractions with suitable solvents and other required procedures, a separation of acid sludges into a large number of valuable by-products is effected.

In the description of the initial steps of the process, e. g., the sulphonation step, it was stated that a partial separation of chemical constituents resulted from the addition of the sulphonating agent in increments. Through such use of increments it is possible to produce acid oils and acid sludges which contain a preponderance of one type of reaction products. Further by such preliminary segregation subsequent processing steps and the recovery of by-products, are facilitated. It is also found that while sulphonating, if the temperature as well as acid concentration is controlled, acids of different molecular weight may be isolated.

To illustrate: The base oil is treated with sulphuric acid of from 93% $H_2SO_4$ up to 50% fuming acid at normal temperatures, starting at say 70° F., and the temperature maintained within a range of about 20° F. by suitable control means. After the first two or three increments the acid oil is treated to remove sulphonic acids contained therein. The oil is again treated with fuming acid and the sulphonic acids extracted from the oil. In this manner a series of acid sludges and a series of solvent extracts of sulphonic acids is obtained, thus accomplishing a selective sulphonation of the hydrocarbons. For example, the first few acid sludges will contain a good proportion of acid tar and only a relatively small amount of sulphonic acids. These are processed to recover valuable by-products as described in the figure. The later sludges will have higher concentrations of sulphonic acids. Of these sludges the first in which sulphonic acids predominate will yield acids of a different average molecular weight than sludges produced several acid increments later. Such a feature is due to the fact that the first sulphonic acids are produced from hydrocarbons which are more readily attacked whereas after removal of such hydrocarbons the acid must then attack the more difficultly sulphonated hydrocarbons. In the two cases the sulphonic acids produced will be of different type with respect to the structure of the organic radical. Similarly the various solvent extracts, containing sulphonic acids which had been removed from the oil after each acid treat, will have different types of sulphonic acids in solution.

When the yield of sulphonic acids at the first controlled temperature and $SO_3$ concentration becomes small, the treating temperature and/or $SO_3$ concentration are raised and the process repeated, again controlling the temperature within about 20° F. range. By such temperature and concentration control and by the addition of acid in increments progressive sulphonation of hydrocarbons takes place. Hence by the isolation of acid sludges and solvent extracts in steps and the separate recovery of sulphonic acids therefrom sulphonic acids of different average molecular weights and different structures can readily be obtained.

This application is a division of our copending application Serial Number 198,976, filed March 30, 1938, now Patent No. 2,218,174.

We claim:

1. The process of preparing sulphonic acids which comprises: treating a petroleum oil with a sulphonating agent, removing the sulphonating agent with its contained sulphonic acids and other products, extracting said sulphonic acids with an organic oil insoluble solvent, separating said solvent from said products and sulphonic acids, then extracting said sulphonic acids and non-acidic compounds from said other products with a low boiling aliphatic hydrocarbon solvent, removing said aliphatic hydrocarbon solvent, separating said sulphonic acids and non-acidic compounds, and separately recovering said sulphonic acids.

2. The process of preparing sulphonic acids which comprises: treating a petroleum oil with a sulphonating agent, removing the sulphonating agent with its contained sulphonic acids and other products, extracting said sulphonic acids with methyl alcohol, separating said solvent from said products and sulphonic acids, then extracting said sulphonic acids and non-acidic compounds from said other products with a low boiling aliphatic hydrocarbon solvent, removing said aliphatic hydrocarbon solvent, separating said sulphonic acids and non-acidic compounds, and separately recovering said sulphonic acids.

3. The process of preparing sulphonic acids which comprises: treating a petroleum oil with a sulphonating agent, removing the sulphonating agent with its contained sulphonic acids and other products, extracting said sulphonic acids with anhydrous methyl alcohol, separating said solvent from said products and sulphonic acids, then extracting said sulphonic acids and non-acidic compounds from said other products with a low boiling aliphatic hydrocarbon solvent, removing said aliphatic hydrocarbon solvent, separating said sulphonic acids and non-acidic compounds, and separately recovering said sulphonic acids.

4. The process of preparing sulphonic acids which comprises: treating a petroleum oil with a sulphonating agent, removing the sulphonating agent with its contained sulphonic acids and other products, extracting said sulphonic acids with methyl alcohol in a plurality of steps, separating said solvent from said products and sulphonic acids, then extracting said sulphonic acids and non-acidic compounds from said other products with a low boiling aliphatic hydrocarbon solvent, removing said aliphatic hydrocarbon solvent, separating said sulphonic acids and non-acidic compounds, and separately recovering said sulphonic acids.

5. The process of preparing sulphonic acids which comprises: extracting an acid sludge containing sulphuric acid, sulphonic acids, organic sulphur compounds, polymers, resins, and tarry matter with an organic oil-insoluble solvent whereby the sulphuric acid, sulphonic acids, organic sulphur compounds, polymers and resins are dissolved and the tarry matter remains undissolved; separating the solvent solution from the undissolved tarry matter; evaporating the solvent from the constituents dissolved therein; extracting said constituents with a low boiling aliphatic hydrocarbon solvent whereby the sulphonic acids, polymers, and resins are dissolved and the sulphuric acid and organic sulphur compounds remain undissolved; evaporating said aliphatic hydrocarbon solvent from said sulphonic acids, polymers, and resins; and extracting the sulphonic acids from the polymers and resins with water.

6. The process according to claim 5 in which the organic oil-insoluble solvent is methyl alcohol.

7. In a process wherein valuable products are obtained from acid sludge resulting from the treatment of petroleum oil with a sulphonating agent, the steps which comprise: extracting an acid sludge containing sulphuric acid, sulphonic acids, and tarry matter with an organic oil-insoluble solvent whereby the sulphuric acid and sulphonic acids are substantially dissolved and the tarry matter remains substantially undissolved, and then separating the resulting solvent solution from the undissolved tarry matter.

8. The steps according to claim 7 in which the organic oil-insoluble solvent is methyl alcohol.

9. In a process wherein valuable products are obtained from acid sludges resulting from the treatment of petroleum oil with a sulphonating agent, the combination of steps which comprises: extracting an acid sludge containing sulphuric acid, sulphonic acids, organic sulphur compounds and tarry matter with an organic oil-insoluble solvent whereby the sulphuric acid, sulphonic acids, and organic sulphur compounds are substantially dissolved and the tarry matter remains undissolved; separating the resulting solvent solution from the undissolved tarry matter; evaporating the solvent from the solution; and separating the sulphonic acids from the resulting mixture by extraction with a low boiling aliphatic hydrocarbon solvent.

10. The process of preparing valuable products from acid sludges resulting from the treatment of petroleum oil with a sulphonating agent which comprises: extracting an acid sludge containing sulphonic acids, sulphuric acid, and tarry matter with an organic oil-insoluble solvent whereby the sulphonic acids and sulphuric acid are dissolved and the tarry matter remains undissolved; separating the resultant solvent solution from the undissolved tarry matter; hydrolysing said tarry matter; extracting the hydrolysed tarry matter with a light petroleum solvent leaving a residue; and then removing and saponifying said residue.

11. The process of preparing valuable products from acid sludges resulting from the treatment of petroleum oil with a sulphonating agent which comprises: extracting an acid sludge containing sulphonic acids, sulphuric acid, and tarry matter with an organic oil-insoluble solvent whereby the sulphonic acids and sulphuric acid are dissolved and the tary matter remains undissolved; separating the resultant solvent solution from the undissolved tarry matter; hydrolysing said tarry matter; extracting the hydrolysed tarry matter with a light petroleum solvent leaving a residue; removing said residue from the solvent solution; evaporating the solvent to obtain a second residue; and then extracting said second residue with acetone to obtain a thermo-plastic resin as a third residue.

12. The process of preparing valuable products from acid sludges resulting from the treatment of petroleum oil with a sulphonating agent which comprises: extracting an acid sludge containing sulphonic acids, sulphuric acid, and tarry matter with an organic oil-insoluble solvent whereby the sulphonic acids and sulphuric acid are dissolved and the tarry matter remains undissolved; separating the resultant solvent solution from the undissolved tarry matter; hydrolysing said tarry matter; extracting the hydrolysed tarry matter with a light petroleum solvent leaving a residue; removing said residue from the solvent solution; evaporating the solvent solution to obtain a second residue; extracting said second residue with acetone to obtain a third residue; removing said third residue from the acetone solution; and evaporating said acetone solution to obtain a plasticizer therefrom.

13. The process of preparing valuable products from acid sludges resulting from the treatment of petroleum oil with a sulphonating agent which comprises: extracting an acid sludge containing sulphuric acid, sulphonic acids, organic sulphur compounds, polymers, resins, and tarry matter with an organic oil insoluble solvent whereby the sulphuric acid, sulphonic acids, organic sulphur compounds, polymers and resins are dissolved and the tarry matter remains undissolved; separating the solvent solution from the undissolved tarry matter; evaporating the solvent from the constituents dissolved therein; extracting said constituents with a low boiling aliphatic solvent whereby the sulphonic acids, polymers, and resins are dissolved and the sulphuric acid and organic sulphur compounds remain undissolved; separating the solvent solution from the undissolved matter; extracting said undissolved matter with an aromatic hydrocarbon solvent to form a solvent layer and a sulphuric acid layer; treating the solvent layer with aqueous alkali; and separating the resultant aqueous layer.

14. The process of purifying acid sludges for the recovery of sulphuric acid which comprises: extracting an acid sludge containing sulphuric acid, sulphonic acids, organic sulphur compounds, and tarry matter with an oil-insoluble organic solvent; separating the precipitated tarry matter; evaporating the solvent; extracting the sulphonic acids with an aliphatic hydrocarbon solvent; and extracting the organic sulphur compounds with an aromatic hydrocarbon solvent, whereby the sulphuric acid is substantially free of organic matter.

15. The process of preparing sulphonic acids from hydrocarbon oils which comprises: treating a petroleum oil with a sulphonating agent in a series of increments to provide sulphonic acids dissolved in the sulphonating agent, increasing the temperature of treatment with each increment, removing the spent sulphonating agent and dissolved sulphonic acids after each increment, extracting said sulphonic acids from said sulphonating agent with an oil-insoluble organic solvent after each increment, and recovering the sulphonic acids from said solvent.

16. The process of preparing sulphonic acids from hydrocarbon oils which comprises: treating a petroleum oil with a sulphonating agent in a series of increments to provide sulphonic acids dissolved in the sulphonating agent, increasing the temperature of treatment with each increment, removing the spent sulphonating agent and dissolved sulphonic acids after each increment, extracting said sulphonic acids from said sulphonating agent with an oil-insoluble organic solvent after each increment, extracting said sulphonic acids from said solvent with a low boiling aliphatic hydrocarbon solvent, and recovering the sulphonic acids from said aliphatic hydrocarbon solvent.

ARTHUR LAZAR.
PAUL MORITZ RUEDRICH.